US010056908B2

(12) United States Patent
Rigetti et al.

(10) Patent No.: US 10,056,908 B2
(45) Date of Patent: Aug. 21, 2018

(54) OPERATING A COUPLER DEVICE TO PERFORM QUANTUM LOGIC GATES

(71) Applicant: RIGETTI & CO., INC., Berkeley, CA (US)

(72) Inventors: Chad Tyler Rigetti, Emeryville, CA (US); Eyob A. Sete, Walnut Creek, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 0 days.

(21) Appl. No.: 15/121,483

(22) PCT Filed: Dec. 22, 2015

(86) PCT No.: PCT/US2015/067416
§ 371 (c)(1),
(2) Date: Aug. 25, 2016

(87) PCT Pub. No.: WO2017/111949
PCT Pub. Date: Jun. 29, 2017

(65) Prior Publication Data
US 2017/0230050 A1 Aug. 10, 2017

(51) Int. Cl.
*H03K 19/195* (2006.01)
*G06F 13/40* (2006.01)
(Continued)

(52) U.S. Cl.
CPC ....... *H03K 19/195* (2013.01); *G06F 13/4068* (2013.01); *G06N 99/002* (2013.01); *H04L 9/0852* (2013.01)

(58) Field of Classification Search
CPC H03K 19/195; G06F 13/4068; G06N 99/002; H04L 9/0852
(Continued)

(56) References Cited

U.S. PATENT DOCUMENTS 6,900,456 B2   5/2005   Blais et al.
7,655,850 B1   2/2010   Ahn
(Continued)

FOREIGN PATENT DOCUMENTS

WO   WO2015/178990   11/2015
WO   WO2015/178991   11/2015
WO   WO2015/178992   11/2015

OTHER PUBLICATIONS

International Search Report and Written Opinion for PCT App. No. PCT/US15/67416, dated Mar. 11, 2016, 12 pages.
(Continued)

*Primary Examiner* — Don Le
(74) *Attorney, Agent, or Firm* — Henry Patent Law Firm PLLC

(57) ABSTRACT

In a general aspect, a quantum logic gate can be performed by tuning a coupler device. One or more coupler control signals can be received at a coupler device in a quantum processor cell. In some instances, in response to the coupler control signals, a coupler operating frequency of the coupler device changes toward a qubit operating frequency of a qubit device, and a phase shift arises in a quantum state of the qubit device due to an interaction between the qubit device and the coupler device. In some instances, in response to the control signals, the coupler operating frequency changes toward a first qubit operating frequency of a first qubit device, then changes toward a second qubit operating frequency of a second qubit device, and a controlled-phase shift arises in a quantum state of the qubit devices due to interactions between the coupler device and the respective qubit devices.

14 Claims, 11 Drawing Sheets

(51) Int. Cl.
*H04L 9/08* (2006.01)
*G06N 99/00* (2010.01)

(58) Field of Classification Search
USPC .................................................. 326/7
See application file for complete search history.

(56) References Cited

U.S. PATENT DOCUMENTS

| | | | |
|---|---|---|---|
| 7,932,515 B2 | 4/2011 | Bunyk | |
| 8,642,998 B2 | 2/2014 | Gambetta et al. | |
| 8,872,360 B2 | 10/2014 | Chow et al. | |
| 2007/0194225 A1* | 8/2007 | Zorn | B82Y 35/00 250/306 |
| 2015/0034808 A1* | 2/2015 | Yuan | G01J 1/44 250/214.1 |
| 2016/0267032 A1* | 9/2016 | Rigetti | G06N 99/002 |

OTHER PUBLICATIONS

Chow, J. Quantum Information Processing with Superconducting Qubits—Chapter 4. Dissertation, Yale School of Engineering and Applied Sciences, May 2010, 39 pages.
Ekert, A et al. Geometric Quantum Computation, arXiv: quant-ph/004015v1, dated Feb. 2008, 15 pages.
Richer, S. Perturbative Analysis of Two-Qubit Gates on Transmon Qubits. Thessis, RWTH Aachen University, Sep. 2013, 70 pages.
Blais, A. et al, Cavity quantum electrodynamics for superconducting electrical circuits: an architecture for quantum computation, arXiv:cond-mat/0402216v1, dated Feb. 2008, 14 pages.
Egger, D.J. et al, Optimized controlled Z gates for two superconducting qubits coupled through a resonator, Superconductor Science and Technology 27, 014001 (2014), 12 pages.
Ghosh, J., et al, High-fidelity controlled-oz gate for resonator-based superconducting quantum computers, Physical Review A 87, 022309 (2013), 19 pages.
DiCarlo, L., et al., Demonstration of two-qubit algorithms with a superconducting quantum processor, Nature 460, 240 (2009), 9 pages.
Strauch, et al., Quantum Logic Gates for Coupled Superconducting Phase Qubits, Physical Review Letters 91, 167005 (2013), 4 pages.
Strauch, Quantum logic gates for superconducting resonator qubits, Physical Review A 84, 052313 (2011), 10 pages.
Rigetti, C.T., Quantum Gates for Superconducting Qubits, Dissertation—Yale University, 2009, 248 pages.
Strand, J. D., et al., "First-order sideband transitions with flux-driven asymmetric transmon qubits", arXiv:1301.0535v2 [cond-mat.supr-con] (Journal Ref: Phys. Rev. B 87, 220505, 2013), Jun. 21, 2013, 7 pages.
David Isaac Schuster, Circuit Quantum Electrodynamics, 2007.†
Jochen Braumuller, Development of tunable transmon qubit in microstrip geometry, Karlsruhe Institute of Technology, Dec. 12, 2013.†
Alexandre Blais et al., Cavity quantum electrodynamics for superconducting electrical circuits An architecture for quantum computation, published Jul. 23, 2004, Physical Review A 69, Department of Physics, Indiana University, Bloomington, Indiana 47405.†
D. I. Schuster et al., ac Stark Shift and Dephasing of a Superconducting Qubit Strongly Coupled to a Cavity Field, published Mar. 30, 2005, Physical Review Letters, Departments of Applied Physics and Physics, Yale University, New Haven, CT 06520.†

\* cited by examiner
† cited by third party

OPERATING A COUPLER DEVICE TO PERFORM QUANTUM LOGIC GATES

BACKGROUND

The following description relates to operating a coupler device to perform quantum logic gates.

Quantum computers can perform computational tasks by executing quantum algorithms. Quantum algorithms are often expressed as a quantum circuit that operates on qubits. In some quantum computing architectures, the quantum circuits are implemented as a series of quantum logic gates, which may include single-qubit gates and two-qubit gates, for example.

SUMMARY

In a general aspect, a coupler device is used to perform a quantum logic gate in a quantum computing system. For example, a single-qubit gate or two-qubit gate may be performed.

In some aspects, in response to one or more coupler control signals received at a coupler device, a coupler operating frequency of the coupler device changes toward a qubit operating frequency of a qubit device, and a phase shift arises in a quantum state of the qubit device due to an interaction between the qubit device and the coupler device.

In some aspects, in response to one or more coupler control signals received at a coupler device, a coupler operating frequency of the coupler device changes toward a first qubit operating frequency of a first qubit device, and then changes toward a second qubit operating frequency of a second qubit device, and a controlled-phase shift arises in a quantum state of the first and second qubit devices due to interactions between the coupler device and the respective first and second qubit devices.

In some aspects, in response to one or more coupler control signals received at a coupler device, a coupler operating frequency of the coupler device is lowered toward a frequency corresponding to a joint excited state of two qubit devices, and a controlled-phase shift arises in a quantum state of the qubit devices due to interactions between the coupler device and the respective qubit devices.

The details of one or more implementations are set forth in the accompanying drawings and the description below. Other features, objects, and advantages will be apparent from the description and drawings, and from the claims.

DETAILED DESCRIPTION

In some aspects of what is described, one or more quantum logic gates (e.g., a single-qubit phase gate or a two-qubit controlled-phase gate) are performed. In some cases, the quantum logic gates form a subset of universal quantum gates for implementing quantum algorithms. For instance, a set of single-qubit and two-qubit gates can form a universal set of quantum gates for implementing any quantum algorithm. The gates can be used, for instance, in quantum computing systems to perform computational tasks. In some cases, the quantum logic gates can be performed with high fidelity, short gate operation time and easy tunability. In some instances, the quantum logic gates can be implemented to achieve a scalable quantum computing device.

In some implementations, techniques described here can provide the ability to generate single-qubit phase gates or two-qubit controlled-phase gates (or both) by applying a direct current (DC) pulse to a coupler device in a quantum processor cell. These and other types of single-qubit gates or two-qubit gates may be performed with high accuracy using DC tuning, in some instances, without applying radio frequency (RF) or microwave pulses. In some cases, using DC pulses can simplify system requirements and reduce costs. In some implementations, single-qubit phase gates or two-qubit controlled-phase gates (or both) can be performed quickly, with high fidelity and with easy tunability. For instance, a coupler device can be tuned to control the coupling, the gate time, the gate fidelity or other metrics that can be used to characterize the quality of the gate. As an example, in some cases, the gate time can be on the order of 30-150 nanoseconds (ns) in length, with a fidelity above 0.99. In some cases, quantum logic gates can be implemented in a manner that provides scalability in a quantum computing architecture. For instance, a qubit array can be formed by two or more types of qubit devices with distinct, fixed frequencies. In some cases, qubit devices that have fixed frequencies can allow long coherence times. In some cases, the techniques described here can be implemented in a manner that provides a high ON/OFF ratio for coupling between qubit devices. Other advantages or attributes may be achieved in various implementations of the subject matter described.

Figure 1:
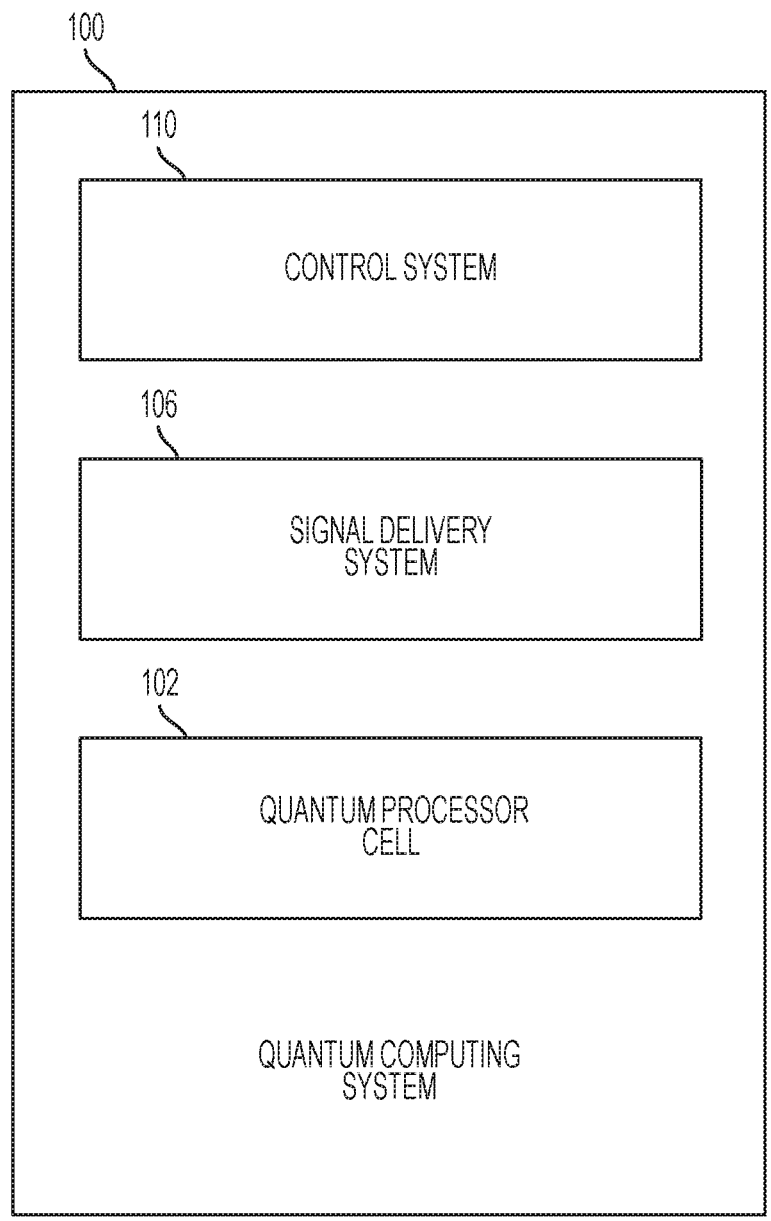
FIG. 1 is a bock diagram of an example quantum computing system.

FIG. 1 is a schematic diagram of an example quantum computing system 100. The example quantum computing system 100 shown in FIG. 1 includes a control system 110, a signal delivery system 106, and a quantum processor cell 102. A quantum computing system may include additional or different features, and the components of a quantum computing system may operate as described with respect to FIG. 1 or in another manner.

The example quantum computing system 100 shown in FIG. 1 can perform quantum computational tasks by executing quantum algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. Coupler devices can be used to perform quantum logic operations on single qubits or conditional quantum logic operations on multiple qubits. In some instances, the conditional quantum logic can be performed in a manner that allows large-scale entanglement within the quantum computing device. Control signals can manipulate the quantum states of individual qubits and the joint states of multiple qubits. In some instances, information can be read out from the composite quantum system by measuring the quantum states of the individual qubits.

In some implementations, the quantum computing system 100 can operate using gate-based models for quantum computing. In some models, fault-tolerance can be achieved by applying a set of high-fidelity control and measurement operations to the qubits. For example, topological quantum error correction schemes can operate on a lattice of nearest-neighbor-coupled qubits. In some instances, these and other types of quantum error correcting schemes can be adapted for a two- or three-dimensional lattice of nearest-neighbor-coupled qubits, for example, to achieve fault-tolerant quantum computation. The lattice can allow each qubit to be independently controlled and measured without introducing errors on other qubits in the lattice. Adjacent pairs of qubits in the lattice can be addressed, for example, with two-qubit gate operations that are capable of generating entanglement, independent of other pairs in the lattice.

In some implementations, the quantum computing system 100 is constructed and operated according to a scalable quantum computing architecture. For example, in some cases, the architecture can be scaled to a large number of qubits to achieve large-scale general purpose coherent quantum computing. In some instances, the architecture is adaptable and can incorporate a variety of modes for each technical component. For example, the architecture can be adapted to incorporate different types of qubit devices, coupler devices, readout devices, signaling devices, etc.

The example quantum processor cell 102 shown in FIG. 1 includes qubit devices that are used to store and process quantum information. In some instances, all or part of the quantum processor cell 102 functions as a quantum processor, a quantum memory, or another type of subsystem. The quantum processor cell 102 shown in FIG. 1 can be implemented, for example, as the quantum processor cell 204 shown in FIG. 2A or in another manner.

In the example quantum processor cell 102, the qubit devices each store a single qubit (a bit of quantum information), and the qubits can collectively define the computational state of a quantum processor or quantum memory. The quantum processor cell 102 may also include readout devices that selectively interact with the qubit devices to detect their quantum states. For example, the readout devices may generate readout signals that indicate the computational state of the quantum processor or quantum memory. The quantum processor cell 102 may also include coupler devices that selectively operate on individual qubits or pairs of qubits. For example, the coupler devices may produce entanglement or other multi-qubit states over two or more qubits in the quantum processor cell 102.

In some implementations, the example quantum processor cell 102 can process the quantum information stored in the qubits by applying control signals to the qubit devices or to the coupler devices housed in the quantum processor cell. The control signals can be configured to encode information in the qubit devices, to process the information by performing logical gates or other types of operations, or to extract information from the qubit devices. In some examples, the operations can be expressed as single-qubit gates, two-qubit gates, or other types of logical gates that operate on one or more qubits. A sequence of operations can be applied to the qubits to perform a quantum algorithm. The quantum algorithm may correspond to a computational task, a quantum error correction procedure, a quantum state distillation procedure, or a combination of these and other types of operations.

In the example shown in FIG. 1, the signal delivery system 106 provides communication between the control system 110 and the quantum processor cell 102. For example, the signal delivery system 106 can receive control signals (e.g., qubit control signals, readout control signals, coupler control signals, etc.) from the control system 110 and deliver the control signals to the quantum processor cell 102. In some instances, the signal delivery system 106 performs preprocessing, signal conditioning, or other operations to the control signals before delivering them to the quantum processor cell 102.

In the example quantum computing system 100 shown in FIG. 1, the control system 110 controls operation of the quantum processor cell 102. The example control system 110 may include data processors, signal generators, interface components and other types of systems or subsystems. In some cases, the control system 110 includes one or more classical computers or classical computing components.

Figure 2A:
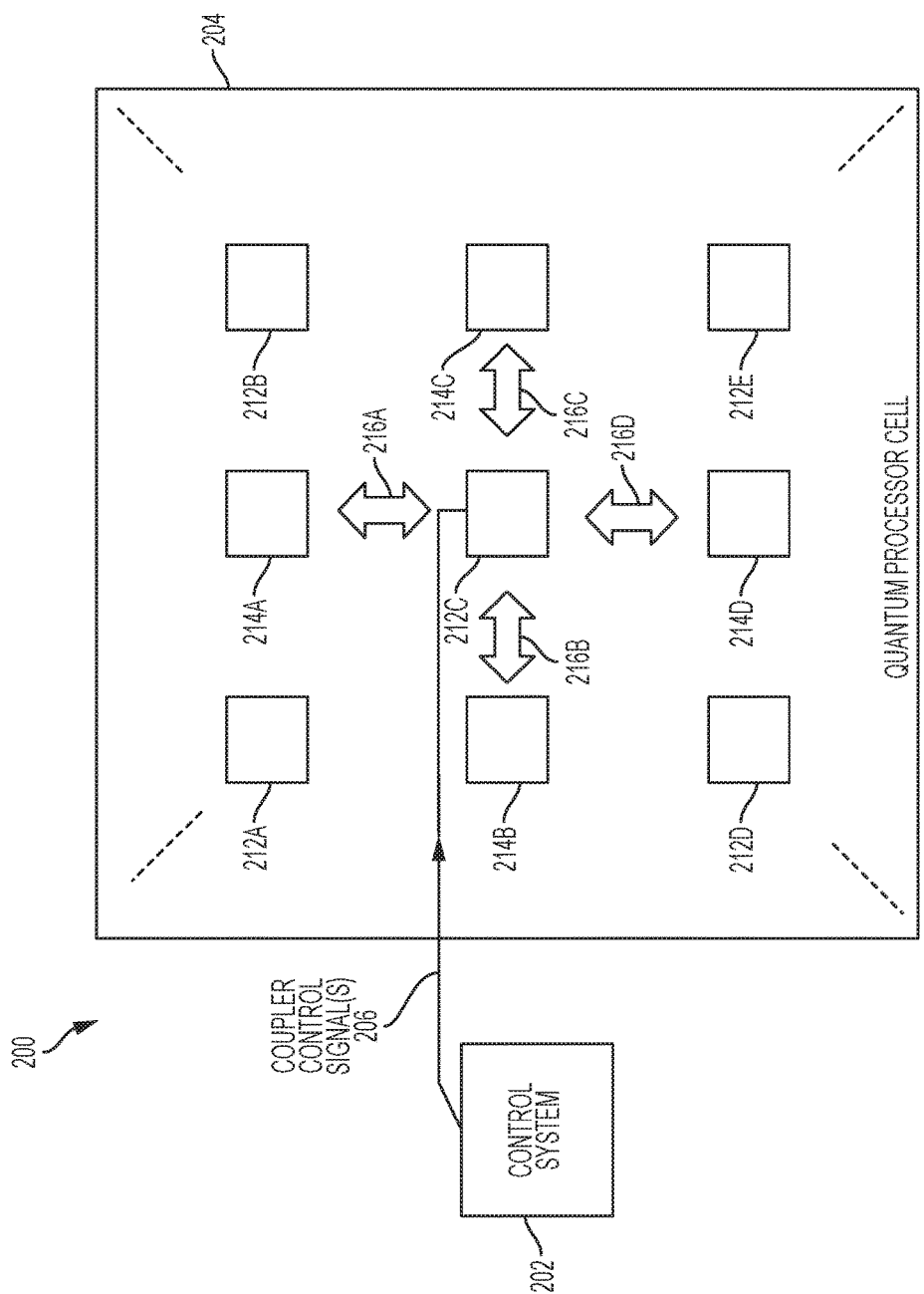
FIG. 2A is a block diagram showing devices and interactions in an example quantum computing system.

FIG. 2A is a block diagram showing devices and interactions in an example quantum computing system 200. As shown in FIG. 2A, the example quantum computing system 200 includes a control system 202 and a quantum processor cell 204. The quantum computing system 200 may include additional or different features, and the components may be arranged in another manner.

The example quantum processor cell 204 includes a two-dimensional or three-dimensional device array, which includes coupler devices and qubit devices arranged in a lattice structure. Nine of the devices in the device array are shown in FIG. 2A. In particular, FIG. 2A shows five coupler devices 212A, 212B, 212C, 212D, 212E and four qubit devices 214A, 214B, 214C, 214D. In some examples, the coupler devices are implemented as fluxonium devices, and the qubit device are implemented as transmon device. The coupler devices and qubit devices may be implemented by other types of components.

In the example shown in FIG. 2A, the devices are arranged in a rectilinear (e.g., rectangular or square) array that extends in two spatial dimensions (in the plane of the page), and each coupler device has four nearest-neighbor qubit devices. In some implementations, the devices can be arranged in another type of ordered array. In some instances, the rectilinear array also extends in a third spatial dimension (in/out of the page), for example, to form a cubic array or another type of three-dimensional array. The quantum processor cell 204 may include additional devices, including additional qubit devices, coupler devices and other types of devices.

In some implementations, the control system 202 interfaces with the quantum processor cell 204 through a signal delivery system that includes connector hardware elements. For example, the control system connector hardware can include signal lines, signal processing hardware, filters, feedthrough devices (e.g., light-tight feedthroughs, etc.), and other types of components. In some implementations, the control system connector hardware can span multiple different temperature and noise regimes. For example, the control system connector hardware can include a series of temperature stages (60 K, 3 K, 800 mK, 150 mK) that decrease between a higher temperature regime of the control system 202 and a lower temperature regime of the quantum processor cell 204.

The quantum processor cell 204, and in some cases all or part of the signal delivery system and connection hardware elements, can be maintained in a controlled cryogenic environment. The environment can be provided, for example, by shielding equipment, cryogenic equipment, and other types of environmental control systems. In some examples, the components in the quantum processor cell 204 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

The example control system 202 shown in FIG. 2A may include, for example, a signal generator system, a program interface, a signal processor system and possibly other components. In some instances, components of the control system 202 can operate in a room temperature regime, an intermediate temperature regime, or both. For example, the control system 202 can be configured to operate at much higher temperatures and be subject to much higher levels of noise than are present in the environment of the quantum processor cell 204.

In some implementations, the quantum processor cell 204 can include an electromagnetic waveguide system that provides a low-noise electromagnetic environment for the qubit devices in the quantum processor cell 204. In some implementations, the electromagnetic waveguide system provides an environment for a lattice of devices (e.g., qubit devices, coupler devices, and possibly others). In some instances, the electromagnetic waveguide system includes apertures or other features that allow the delivery of signals to the lattice of qubits and to the coupler devices, and allow the extraction of readout signals from readout devices.

In some implementations, the coupler devices 212A, 212B, 212C, 212D, 212E are housed between neighboring pairs of the qubit devices 214A, 214B, 214C, 214D in a device array within the quantum processor cell 204. The qubit devices can be controlled individually, for example, by delivering coupler control signals to the coupler devices. The qubit devices can also interact with each other through the interactions with the coupler devices. The interactions between neighboring qubit devices can be controlled, for example, by delivering coupler control signals to the individual coupler devices. In some cases, readout devices can detect the states of the qubit devices, for example, by interacting directly with the respective qubit devices.

In the example shown in FIG. 2A, the qubit devices 214A, 214B, 214C, 214D can each be encoded with a single bit of quantum information. Each of the qubit devices has two eigenstates used as computational basis states ("0" and "1"), and each qubit device can transition between its computational basis states or exist in an arbitrary superposition of its basis states. The quantum states of the respective qubit devices can be manipulated by coupler control signals generated by the control system 202. In some examples, the qubit devices are implemented by a charged-based qubit devices, such as, for example, the transmon qubit device shown in FIG. 2B. Other types of qubit devices may be used.

In some examples, each qubit device in the quantum processor cell 204 has a fixed qubit operating frequency that is defined by an electronic circuit of the qubit device. For instance, a qubit device (e.g., a transmon qubit) may be implemented without a superconducting SQUID loop. In some examples, the qubit operating frequency of a qubit device is tunable, for example, by application of an offset field. For instance, a qubit device (e.g., a fluxonium qubit) may include a superconducting SQUID loop that is tunable by application of magnetic flux.

In some implementations, the coupler devices in the quantum processor cell 204 allow the qubits to be selectively coupled on-demand, to perform single-qubit gates, to perform multi-qubit gates, to entangle neighboring pairs of qubits, or to perform other types of operations. The coupler devices can have a high "on/off" ratio, which refers to the ratio of the coupling rate provided by the coupler device when the coupler device is in its ON state versus its OFF state. In some examples, the coupler devices are implemented by a flux-based qubit, such as, for example, the fluxonium qubit device shown in FIG. 2C. Other types of coupler devices may be used.

In some examples, each coupler device has a tunable coupler operating frequency. For example, the coupler operating frequency can be tuned by applying an offset field to the coupler device. The offset field can be, for example, a magnetic bias field, a DC electrical voltage, or another type of constant field. As a particular example, a coupler device may include a superconducting quantum interference device (SQUID) loop whose resonance frequency determines the coupling strength with each neighboring qubit device. For instance, the coupling strength may be increased by setting the resonance frequency of the SQUID loop in a frequency range near the resonance frequency of either qubit device. In such examples, the resonance frequency of the SQUID loop can be tuned by controlling the amount of magnetic flux experienced by the SQUID loop. Thus, manipulating the magnetic flux can increase or decrease the resonance frequency of the SQUID loop, which in turn influences the coupling strength provided by the coupler device. In this example, the magnetic flux through the SQUID loop is an offset field that can be modified in order to tune the coupler resonance frequency. For instance, the coupler device can include an inductor that is coupled to the SQUID loop by a mutual inductance. Thus, the magnetic flux through the SQUID loop can be controlled by the DC component of the current through the inductor. In some cases, a coupling strength can be controlled by both AC and DC components of the coupler control signal.

In some implementations, coupler devices that are tunable by application of an offset field are used with qubit devices that do not respond to offset fields. This may allow the coupler devices to be selectively activated by an offset field that does not disturb the information encoded in the qubit device. For instance, although the offset field may cause the coupler device to produce an electromagnetic interaction between neighboring qubit devices, the offset field does not directly interact with the qubit device or disturb the quantum state of the qubit device even if the qubit device experiences the offset field. Thus, the combination of tunable couplers with fixed-frequency qubit devices may allow selective, on-demand coupling of qubit devices while improving performance of the qubit devices. For example, the fixed-frequency qubit devices may have longer coherence times, may be more robust against environmental or applied offset fields, etc.

In some instances, information is encoded in the qubit devices, and the information can be processed by operation of the coupler devices. For instance, input information can be encoded in the computational states or computational subspaces defined by some of all of the qubit devices. The information can be processed, for example, by applying a quantum algorithm or other operations to the input information. The quantum algorithm may be decomposed as gates or instruction sets that are performed by the qubit devices and coupler devices over a series of clock cycles. For instance, a quantum algorithm may be executed by a combination of single-qubit gates and two-qubit gates. In some cases, information is processed in another manner. Processing the information encoded in the qubit devices produces output information that can be extracted from the qubit devices. The output information can be extracted, for example, by performing state tomography or individual readout operations. In some instances, the output information is extracted over multiple clock cycles or in parallel with the processing operations.

In some aspects of operation, the control system 202 sends coupler control signals to the coupler devices in the quantum processor cell. The coupler control signals can be configured to cause the coupler devices to change (increase or decrease) their respective coupler operating frequencies. For example, the coupler control signal can be a bias signal that varies an offset electromagnetic field experienced by the coupler device, and varying the offset electromagnetic field can change the resonance frequency of the coupler device. In some implementations, the control signal can be a direct current (DC) electrical signal that is communicated from the control system 202 to the individual coupler device.

The example coupler control signals 206 shown in FIG. 2A are configured to change (e.g., increase, decrease) the coupler operating frequency of the coupler device 212C according to a control sequence. For example, a coupler control signals may be configured to tune the coupler device 212C according to the coupler operating frequency 310 shown in FIG. 3A, the coupler operating frequency 370 shown in FIG. 3B, the coupler operating frequency 436 shown in FIG. 4, the coupler operating frequency 512 shown in FIG. 5A, or another coupler operating frequency.

In the example shown in FIG. 2A, the control system 202 sends coupler control signals 206 to the coupler device 212C to generate interactions between the coupler device 212C and any of the nearest neighbor qubit devices. In particular, the coupler control signals can generate a first interaction 216A between the coupler device 212C and the first qubit device 214A, a second interaction 216B between the coupler device 212C and the second qubit device 214B, a third interaction 216C between the coupler device 212C and the third qubit device 214C, a fourth interaction 216D between the coupler device 212C and the fourth qubit device 214D, or a combination of them in series or in parallel.

In some implementations, the coupler control signals are configured to generate interactions that perform quantum logic gates on the quantum states of one or more of the qubit devices. For example, in some cases, in response to one or more of the coupler control signals 206, the coupler device 212C produces a phase shift in a quantum state of one of the neighboring qubit devices. For instance, the coupler device 212C may produce a phase shift in a quantum state of the first qubit device 214A by the first interaction 216A between the first qubit device 214A and the coupler device 212C; the coupler device 212C may produce a phase shift in a quantum state of the second qubit device 214B by the second interaction 216B between the second qubit device 214B and the coupler device 212C; etc.

In some cases, in response to one or more of the coupler control signals 206, the coupler device 212C produces a controlled-phase shift in a quantum state of two qubit devices. For instance, the coupler device 212C may produce a controlled-phase shift in a quantum state of the first and second qubit devices 214A, 214B by the interactions (216A, 216B) between the coupler device 212C the respective first and second qubit device 214A, 214B; the coupler device 212C may produce a controlled-phase shift in a quantum state of the first and third qubit devices 214A, 214C by the interactions 216A, 216C between the coupler device 212C the respective first and third qubit device 214A, 214C; etc.

In some implementations, the coupler control signals 206 in FIG. 2A are configured to vary the coupler operating frequency of the coupler device 212C over a time period of the interactions that produce the phase shift or the controlled-phase shift. For example, the coupler operating frequency may increase during one or more portions the time period, decrease during one or more portions the time period, remain constant during one or more portions of the time period, in various combinations. The rate and duration of increase or decrease can also be controlled.

In some implementations, the degree of phase shift produced, or the degree of controlled-phase shift produced, is controlled by the attributes of the coupler control signals 206. For example, for a single-qubit phase gate, the phase acquired by the quantum state of the qubit can be controlled, at least in part, by a duration of the coupler control signal, an amplitude of the coupler control signal and possibly other attributes. As another example, for a two-qubit controlled-phase gate, the controlled-phase acquired by the quantum state of the two qubits can be controlled, at least in part, by a duration of the coupler control signal, an amplitude of the coupler control signal and possibly other attributes.

Figure 3A:
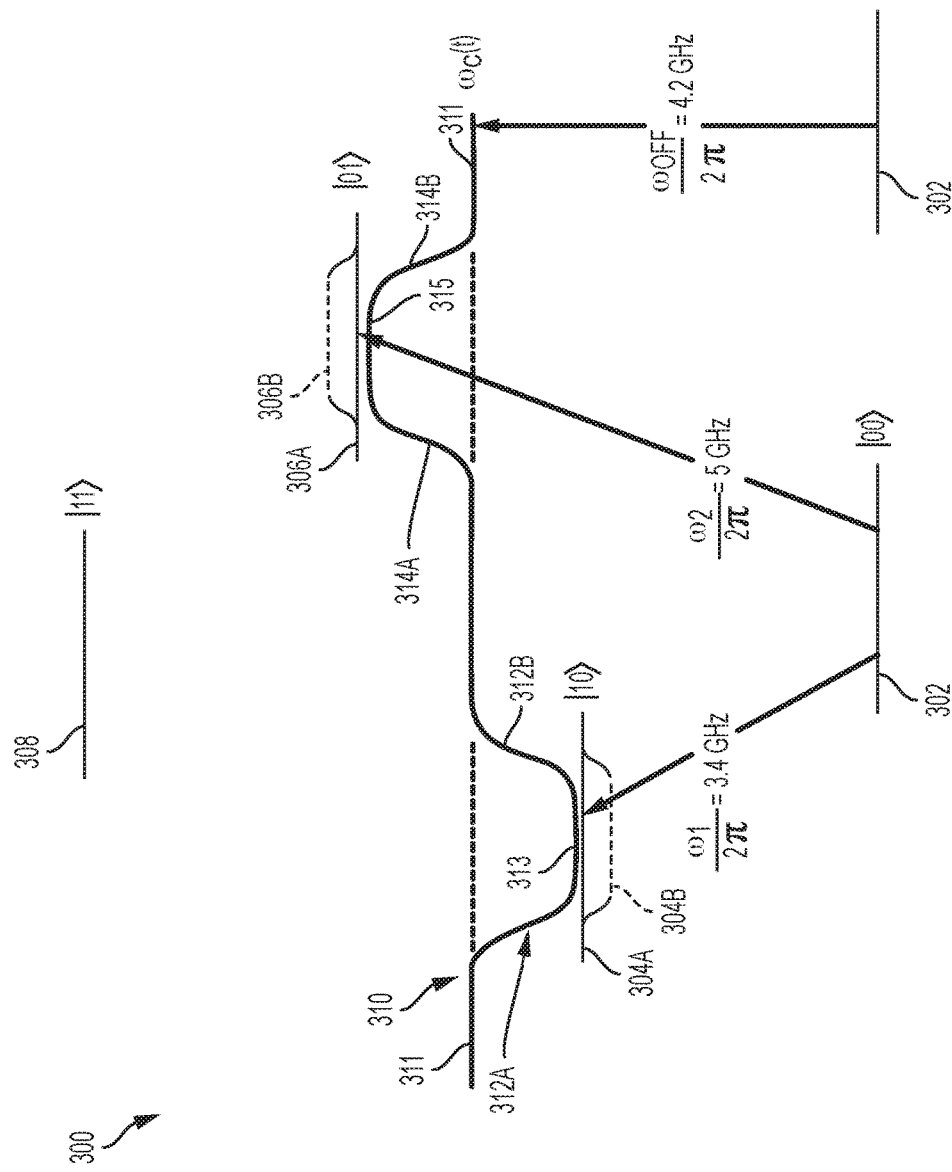
FIG. 3A is an energy level diagram for an example quantum computing system.

In some instances, the control system 202 generates a first coupler control signal that is configured to tune the coupler operating frequency of the coupler device 212C toward a first qubit operating frequency of the first qubit device 214A. For example, the first coupler control signal can be a DC electrical signal that lowers the coupler operating frequency toward a qubit operating frequency of the first qubit device 214A. An example is shown in FIG. 3A, where the coupler operating frequency 310 is lowered (at 312A) from a first frequency level 311 to a second frequency level 313. As shown in FIG. 3A, the coupler operating frequency 310 is then raised back to the first frequency level 311 after an interaction time at the second frequency level 313. In some cases, the first coupler control signal is communicated to the coupler device 212C to generate an interaction 216A that produces a phase shift in the quantum state of the qubit device.

In some instances, after generating the first coupler control signal, the control system 202 generates a second coupler control signal that is configured to tune the coupler operating frequency of the coupler device 212C away from the first qubit operating frequency and toward a second qubit operating frequency of the second qubit device 214B. For example, the second coupler control signal can be a DC electrical signal that raises the coupler operating frequency toward a different qubit operating frequency. An example is shown in FIG. 3A, where the coupler operating frequency 310 is raised (at 314A) from the first frequency level 311 to a third frequency level 315. As shown in FIG. 3A, the coupler operating frequency 310 is lowered back to the first frequency level 311 after an interaction time at the third frequency level 315. In some cases, the first and second coupler control signals are communicated to the coupler device 212C in series to generate interactions 216A, 216B that produce a controlled-phase shift in the quantum state of the first and second qubit devices 214A, 214B.

Figure 3B:
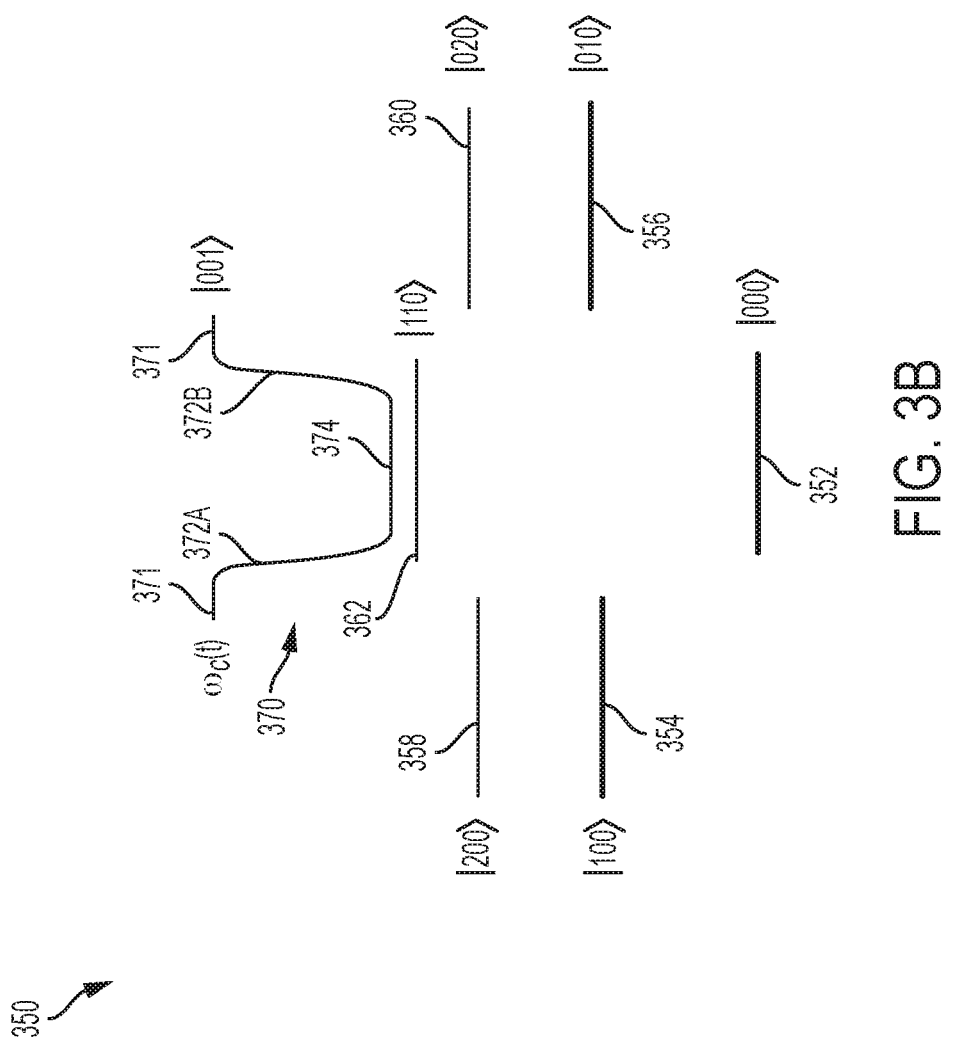
FIG. 3B is another energy level diagram for an example quantum computing system.

In some instances, the control system 202 generates a coupler control signal that is configured to lower the coupler operating frequency of the coupler device 212C toward a joint excited state of the first and second qubit devices 214A, 214B. For example, the first coupler control signal can be a DC electrical signal that lowers the coupler operating frequency toward the frequency of the joint excited state of the two qubits. An example is shown in FIG. 3B, where the coupler operating frequency 370 is lowered (at 372A) from a first frequency level 371 to a second frequency level 374. As shown in FIG. 3B, the coupler operating frequency 370 is raised back to the first frequency level 371 after an interaction time at the second frequency level 374. In some cases, the first coupler control signal is communicated to the coupler device 212C to generate interactions 216A, 216B that produce a controlled-phase shift in the joint quantum state of the first and second qubit devices 214A, 214B. In some examples (e.g., as in FIG. 3B), the coupler operating frequency is maintained higher than the frequencies of the two-photon states of the respective first and second qubit devices during the interactions.

Figure 2B:
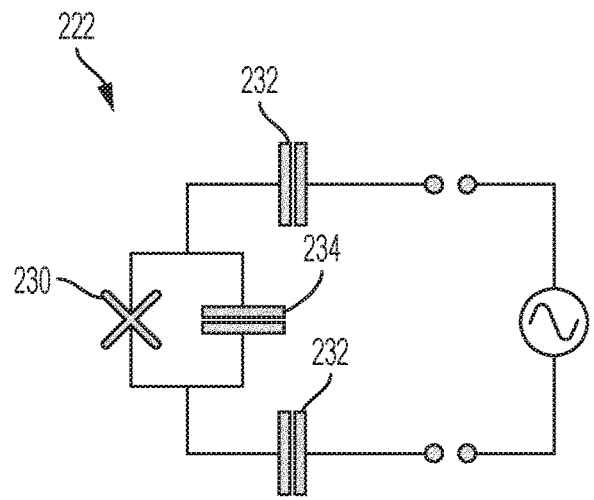
FIG. 2B shows an equivalent circuit for an example transmon qubit device.
Figure 2C:
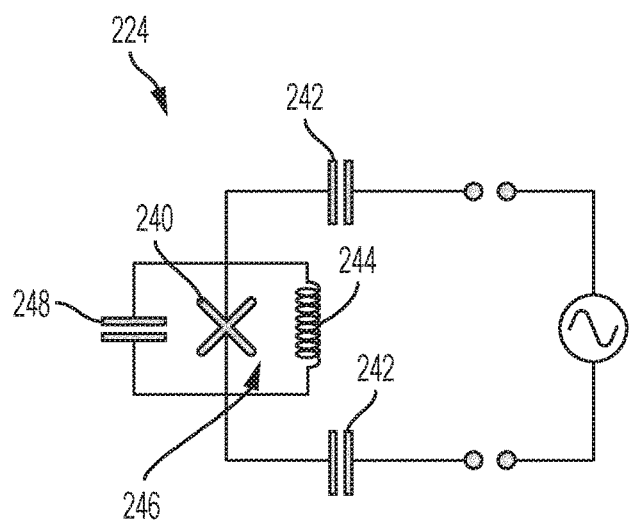
FIG. 2C shows an equivalent circuit for an example fluxonium qubit device.
Figure 2D:
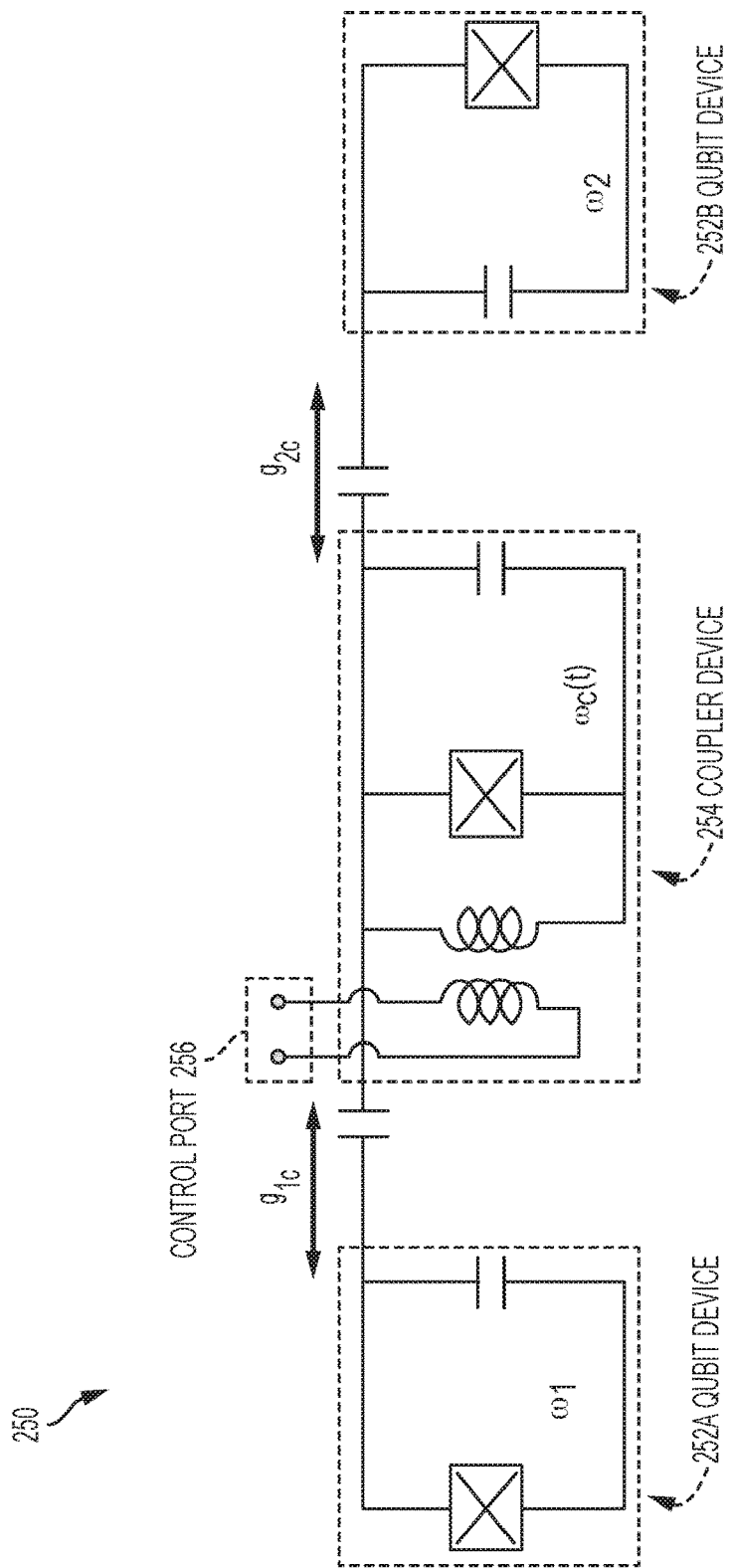
FIG. 2D shows an equivalent circuit for an example quantum computing system.

FIGS. 2B, 2C and 2D show aspects of example devices that may be included in the quantum processor cell 204. The quantum processor cell 204 may include additional or different types of devices. The qubit devices and coupler device in the quantum processor cell 204 may be implemented as charge qubit devices, flux qubit devices or other types of devices. In some examples, the qubit devices 214A, 214B, 214C, 214D can be implemented as transmon qubit devices, and the coupler devices 212A, 212B, 212C, 212D, 212E can be implemented as fluxonium qubit devices. In some examples, the qubit devices 214A, 214B, 214C, 214D can be implemented as fluxonium qubit devices. In some cases, it is beneficial to use a highly anharminic system as a coupler device, with energy levels having large anharmonicity. In some cases, such properties can be achieved using a fluxonium qubit device as a coupler device.

FIG. 2B shows an equivalent circuit 222 for an example transmon qubit device.

The transmon qubit device represented in FIG. 2B is an example of a charge qubit device. In some cases, a transmon qubit device can be fabricated on a substrate (e.g., formed from sapphire, silicon, etc.) that supports a superconducting thin film (e.g., formed from aluminum, niobium, etc.). For instance, the transmon qubit device may be fabricated by double-angle evaporation of thin-film aluminum onto a sapphire or silicon substrate, or by another fabrication process. The example transmon qubit device shown in FIG. 2B includes a Josephson junction 230 and a shunt capacitance 234. In this example, the shunt capacitance 234 is formed in a topologically closed manner to reduce far-field coupling and spurious qubit couplings to non-adjacent couplers and non-neighboring qubits. The example transmon device can be coupled to another device or an electrode, for example, by a differential capacitance 232 formed between the other device and inner and outer electrodes of the Josephson junction 230.

FIG. 2C shows an equivalent circuit 224 for an example fluxonium qubit device. The fluxonium qubit device represented in FIG. 2C is an example of a flux qubit device. In some cases, a fluxonium qubit device can be fabricated on a substrate (e.g., formed from sapphire, silicon, etc.) that supports a superconducting thin film (e.g., formed from aluminum, niobium, etc.). For instance, the fluxonium qubit device may be fabricated by double-angle evaporation of thin-film aluminum onto a sapphire or silicon substrate, or by another fabrication process. The example fluxonium qubit device shown in FIG. 2C includes a Josephson junction 240, a shunt inductance 244 and a shunt capacitance 248 connected in parallel and forming a loop. A magnetic flux signal 246 can be applied to the loop. The magnetic flux signal 246 can be applied to the loop, for example, by applying a DC signal to bias circuitry that has a mutual inductance with the loop. The magnetic flux signal 246 can be, for instance, by a coupler control signal communicated to the bias circuitry. The input capacitance 242 across the Josephson junction 240 can provide a charge-coupling control port. The charge-coupling control port may be formed of a topologically closed capacitance, for instance, where an inner island is encircled by an outer island. In some implementations, a control or coupling port can be realized by coupling the device with a differential capacitance with respect to these two islands to a nearby electrode.

FIG. 2D shows an equivalent circuit 250 for an example quantum computing system. In some examples, the devices represented in FIG. 2D are arranged in a device array or another type of ordered structure. For instance, the equivalent circuit 250 in FIG. 2D can represent any of the coupler devices and its two nearest-neighbor qubit devices in the quantum processor cell 204 in FIG. 2A, or the equivalent circuit 250 in FIG. 2D can represent devices in another type of system or environment. The example quantum computing system represented in FIG. 2D includes a first qubit device 252A, a second qubit device 252B, a coupler device 254 and a control port 256. The quantum computing system may include additional or different features, and the components may be arranged as shown or in another manner.

In the example shown in FIG. 2D, the first and second qubit devices 252A, 252B are implemented as transmon qubit devices. As shown, the qubit device circuitry includes a Josephson junction (represented by the symbol "X" in FIG. 2D) and a shunt capacitance. In the example shown in FIG. 2D, the coupler device 254 includes a fluxonium qubit device and bias control circuitry. As shown, the fluxonium device circuitry includes a Josephson junction, a shunt inductance and a shunt capacitance. The bias circuitry includes an inductance loop that is connected to the control port 256 to receive coupler control signals. Both of the qubit devices 252A, 252B are capacitively coupled to the coupler device 254 by respective differential capacitances 258A, 258B. The qubit devices and coupler devices may be implemented by other types of systems, and the features and components represented in FIG. 2D can be extended in a larger two-dimensional or three-dimensional array of devices.

An example control port 256 is shown in FIG. 2D. In this example, the tunable coupler device 254 includes bias circuitry that is coupled to the coupler control input port 256 to receive coupler control signals. The bias circuitry in the example coupler device 254 is configured to apply an offset field to the fluxonium device circuitry. In particular, the bias circuitry includes an inductor that has a mutual inductance with the fluxonium device circuitry. In the example shown, the resonance frequency of the fluxonium device circuitry is the coupler operating frequency of the example coupler device 254, and the magnetic flux generated by the bias circuitry controls the resonance frequency of the fluxonium qubit device.

In the example shown in FIG. 2D, the coupler operating frequency of the coupler device 254 can change (increase or decrease) in response to a coupler control signal received by the bias circuitry through the control port 256. In some instances, the coupler operating frequency may be increased or decreased to a frequency range near the resonance frequency of either qubit device 252A, 252B. The resonance frequency of the coupler circuitry can be tuned by controlling the amount of magnetic flux experienced by the fluxonium device circuitry. Thus, manipulating the magnetic flux can increase or decrease the resonance frequency of the fluxonium device circuitry, which in turn influences the coupler operating frequency of the coupler device 254.

In the example shown in FIG. 2D, because the inductor in the bias circuitry has a mutual inductance with the fluxonium device circuitry, the magnetic flux through the coupler circuitry can be controlled by the DC component of the current through the inductor. In some instances, the coupler operating frequency is controlled in another manner, for instance, by another type of coupler control signal.

The example quantum computing system shown in FIG. 2D can apply single-qubit gates to the quantum state of either qubit device 252A, 252B, as well as two-qubit gates to the collective quantum state of the qubit devices 252A, 252B. As shown in FIG. 2D, the parameter $g_{1c}$ represents the coupling strength between the first qubit device 252A and the coupler device 254, and the parameter $g_{2c}$ represents the coupling strength between the second qubit device 252A and the coupler device 254. Also shown in FIG. 2D, the two qubit devices 252A, 252B have fixed qubit operating frequencies $\omega_1$ and $\omega_2$, respectively, while the coupler device 254 has a tunable coupler operating frequency $\omega_c(t)$ that changes over time. In this example, the tunability of the coupler operating frequency can be used to generate single-qubit phase gates and two-qubit controlled-phase gates on the qubit devices 252A, 252B. For instance, by tuning the coupler operating frequency close to either of the qubit operating frequencies, a phase interaction can be generated between the two qubit devices 252A, 252B to produce the single-qubit or two-qubit quantum logic gates.

The example system shown in FIG. 2D can be described by the Hamiltonian $$H = \omega_1 \sigma_1^+ \sigma_1 + \omega_2 \sigma_2^+ \sigma_2 + \omega_c(t) \sigma_3^+ \sigma_3 + g_{1c} \sigma_{1x} \otimes \sigma_{3x} + g_{2c} \sigma_{2x} \otimes \sigma_{3x}. \quad (1)$$

Here, $\sigma_i^t$ are the Pauli operators for the qubit devices 252A, 252B and the couple device 254. In the computational basis ($|0\rangle, |1\rangle$) defined by the ground state and first excited state of each individual qubit device 252A, 252B, the one-qubit phase gate can be represented in the following general matrix form $$M = \begin{pmatrix} 1 & 0 \\ 0 & e^{i\varphi} \end{pmatrix},$$

where $\varphi$ is the phase acquired by the state $|1\rangle$ of the qubit device to which the gate is applied during the gate operation.

In the computational basis ($|00\rangle, |01\rangle, |10\rangle, |11\rangle$)) defined by the ground states and first excited states of the two qubit devices 252A, 252B, the two-qubit controlled phase gate or single-qubit phase gate can be represented in the following general matrix form $$M = \begin{pmatrix} 1 & 0 & 0 & 0 \\ 0 & e^{i\varphi_{01}} & 0 & 0 \\ 0 & 0 & e^{i\varphi_{10}} & 0 \\ 0 & 0 & 0 & e^{i\varphi_{11}} \end{pmatrix}, \quad (2)$$

where $\varphi_{01}$, $\varphi_{10}$, and $\varphi_{11}$ are the phases acquired by the states $|01\rangle$, $|10\rangle$, and $|11\rangle$ during the gate operation, respectively. In some instances, a two-qubit controlled-phase gate or single-qubit phase gate can be performed in the example quantum computing system shown in FIG. 2D based on the techniques described with respect to FIGS. 3A, 3B, 4, 5A, 5B and 5C, or quantum logic gates may be performed in another manner.

FIG. 3A is an energy level diagram 300 for the example quantum computing system represented in FIG. 2D. In the energy level diagram 300, the example quantum computing system shown in FIG. 2D is described by the parameter values shown in Table I.

TABLE I

| Example Parameter Values | |
|---|---|
| Parameter | Value |
| $\dfrac{\omega_1}{2\pi}$ | 3.4 GHz |
| $\dfrac{\omega_2}{2\pi}$ | 5.0 GHz |
| $\dfrac{\omega_c^{ON}}{2\pi}$ | 3.6 GHz |
| $\dfrac{\omega_c^{OFF}}{2\pi}$ | 4.2 GHz |
| $\dfrac{g_{1c}}{2\pi}$ | 40 MHz |
| $\dfrac{g_{2c}}{2\pi}$ | 39.5 MHz |
| $\sigma$ | 2.0 ns |
| $t_{ramp}$ | 5.0 ns |

The values shown in Table I are provided as an example. The example quantum computing system shown in FIG. 2D can be implemented with other parameter values, and the techniques described here can be performed in quantum computing systems having other parameter values.

The example energy level diagram 300 shown in FIG. 3A includes four energy levels 302, 304A, 306A and 308 for the first and second qubit devices 252A, 252B. The first energy level 302 corresponds to the quantum state $|00\rangle$, where the qubit devices 252A, 252B are in their respective ground states. The second energy level 304A corresponds to the quantum state $|10\rangle$, where the first qubit device 252A is in its first excited state and the second qubit device 252B is in its ground state. The third energy level 306A corresponds to the quantum state $|01\rangle$, where the first qubit device 252A is in its ground state and the second qubit device 252B is in its first excited state. The fourth energy level 308 corresponds the quantum state $|11\rangle$, where the qubit devices 252A, 252B are in a joint excited state.

The example energy level diagram 300 also shows the energy level corresponding to the coupler operating frequency 310 of the coupler device 254. The example coupler operating frequency 310 changes over time as shown from left to right in FIG. 3A. In this example, the coupler operating frequency begins at a "park" position, which is a first frequency level 311 approximately halfway between the first qubit operating frequency (corresponding to the energy level 304A) and the second qubit operating frequency (corresponding to the energy level 306A). One or more coupler control signals can be communicated to the coupler device 254 to tune the coupler operating frequency 310 as shown in FIG. 3A and generate one or more interactions that perform a quantum logic gate on one or both qubit devices 252A, 252B.

As an example, the coupler operating frequency 310 can be decreased toward the first qubit operating frequency (corresponding to the energy level 304A) to perform a phase gate on the first qubit device 252A. In the example shown, the coupler operating frequency decreases at 312A from the first frequency level 311 toward the first qubit operating frequency 304A. After decreasing at 312A, the coupler operating frequency 310 is maintained at a second frequency level 313 near the first qubit operating frequency 304A. At the second frequency level 313, an interaction between the coupler device 254 and the first qubit device 252A causes an energy level repulsion, represented by the shifted energy level 304B of the first qubit device 252A shown in FIG. 3A. The coupler operating frequency then increases at 312B from the second frequency level 313 away from the first qubit operating frequency 304A. After increasing at 312B, the coupler operating frequency 310 is maintained at the "park" position, which is the first frequency level 311. In some cases, a DC pulse or another type of coupler control signal received at the coupler device 254 causes the coupler operating frequency 310 to change as shown in FIG. 3A and described above.

As another example, the coupler operating frequency 310 can be increased toward the second qubit operating frequency (corresponding to the energy level 306A) to perform a phase gate on the second qubit device 252B. In the example shown, the coupler operating frequency increases at 314A from the first frequency level 311 toward the second qubit operating frequency 306A. After increasing at 314A, the coupler operating frequency 310 is maintained at a third frequency level 315 near the second qubit operating frequency 306A. At the third frequency level 315, an interaction between the coupler device 254 and the second qubit device 252B causes an energy level repulsion, represented by the shifted energy level 306B of the second qubit device 252B in FIG. 3A. The coupler operating frequency then decreases at 314B from the third frequency level 315 away from the second qubit operating frequency 306A. After decreasing at 314B, the coupler operating frequency 310 is maintained at the "park" position, which is the first frequency level 311. In some cases, a DC pulse or another type of coupler control signal received at the coupler device 254 causes the coupler operating frequency 310 to change as shown in FIG. 3A and described above.

In the example quantum computing system shown in FIG. 2D, when the frequency of the coupler device 254 is tuned close the frequency of either qubit device 252A, 252B, an energy level repulsion (due to the AC Stark shift) is generated. This level repulsion gives rise to a phase in the quantum state of the qubit device, thus generating a single-qubit phase gate in some instances. Accordingly, the example quantum computing system shown in FIG. 2D can generate single-qubit gates on the first qubit device 252A by applying a single pulse, for instance, tuning the coupler operating frequency of the coupler device 254 from its park position (e.g., the first frequency level 311) toward the first qubit operating frequency 304A; or the example quantum computing system shown in FIG. 2D can generate single-qubit gates on the second qubit device 252B by applying a single pulse, for instance, tuning the coupler operating frequency of the coupler device 254 from its park position (e.g., the first frequency level 311) toward the second qubit operating frequency 306A. In these examples, the coupler device 254 is maintained in its ground state during the gate operations, so that leakage to the coupler device 254 is avoided, minimized or otherwise reduced.

When a single-qubit phase gate is applied, the coupler operating frequency is controlled by one or more coupler control signal that are communicated to the coupler device 254 from the control system 202. The phase shift produced by the single-qubit gate can be controlled, at least in part, by a duration of the coupler control signal and an amplitude of the coupler control signal. For instance, the amplitude of the coupler control signal can control the amplitude of the coupler operating frequency, and the duration of the coupler control signal can control the duration of the interaction. In some cases, the coupler control signal is configured to vary the coupler operating frequency over a time period of the coupler control signal, and the coupler operating frequency is increased, decreased, or held at a constant level during various portions of the time period according to the coupler control signal. In some examples, the coupler control signal can be configured to generate one or more interactions that produce a phase shift $$\varphi = \int_0^\tau \frac{g^2}{\Delta(t')} dt'$$

where t represents the time period of the interactions, g represents a coupling strength between the coupler device and the qubit device, and $\Delta(t')$ represents a difference between the coupler operating frequency and the qubit operating frequency.

In the example shown in FIG. 2D, when the frequency of the coupler device 254 is tuned close the frequency of one of the qubit devices 252A, 252B and then close to the frequency of the other of the qubit devices 252A, 252B, the energy level repulsions (due to the AC Stark shift) are generated in sequence. The sequence of interactions gives rise to a state-dependent phase shift in the quantum state of the qubit devices, thus generating a two-qubit controlled-phase gate in some instances. Accordingly, the example quantum computing system represented in FIG. 2D can generate two-qubit gates on the first and second qubit devices 252A, 252B by applying a sequence of pulses, for instance, tuning the coupler operating frequency of the coupler device 254 from its park position (e.g., the first frequency level 311) toward the first qubit operating frequency 304A, back to its park position, and then toward the second qubit operating frequency 306A. During the first pulse, the quantum state of the first qubit device 252A acquires a significant phase shift determined by the coupling strength $g_{1c}$ and the frequency difference $\Delta_{1c}$, and the second qubit device 252B may also acquire a small phase shift due to its interaction with the coupler device 254 at the park frequency. During the second pulse, the second qubit device 252B acquires a significant phase shift determined by the coupling strength $g_{2c}$ and the frequency difference $\Delta_{2c}$, and the first qubit device 252A may also acquire a small phase shift due to its interaction with the coupler device 254 at the park frequency.

When a two-qubit phase gate is applied, the coupler operating frequency is controlled by one or more coupler control signals that are communicated to the coupler device 254 from the control system 202. The controlled-phase shift (i.e., the state-dependent phase shift) produced by the two-qubit gate can be controlled, at least in part, by durations of the coupler control signals and amplitudes of the coupler control signal. For instance, the amplitude of the coupler control signal can control the amplitude of the coupler operating frequency, and the duration of the coupler control signal can control the duration of the interaction. In some cases, each coupler control signal is configured to vary the coupler operating frequency over a time period of the coupler control signal, and the coupler operating frequency is increased, decreased, or held at a constant level during various portions of the time period according to the coupler control signal. In some examples, the coupler control signal can be configured to generate one or more interactions that produce a controlled-phase shift $$\varphi = \int_0^t \left( \frac{g_{1c}^2}{\Delta_{1c}(t')} + \frac{g_{2c}^2}{\Delta_{2c}(t')} \right) dt'$$

where t represents the time period of the interactions, $g_{1c}$ represents a coupling strength between the coupler device 254 and the first qubit device 252A, $g_{2c}$ represents a coupling strength between the coupler device 254 and the second qubit device 252B, $\Delta_{1c}(t')$ represents a difference between the coupler operating frequency 310 and the first qubit operating frequency 304A and $\Delta_{2c}(t')$ represents a difference between the coupler operating frequency 310 and the second qubit operating frequency 306A.

The phase shift of each quantum state of the two-qubit system can be computed based on the example shown in FIG. 3A. In a dispersive approximation, where the frequency differences between the qubits and the coupler is much larger than their mutual couplings, $\Delta_{1c}/g_{1c}$, $\Delta_{2c}/g_{2c}$ ≫ 1 ($\Delta_{1c}=\omega_1-\omega_c$, $\Delta_{2c}=\omega_2-\omega_c$), the net phase shifts acquired by the two-qubit states are given by Net phase shift for |01⟩:

$$\varphi_{01} = \int_0^{t_{gate}} \frac{g_{1c}^2}{\Delta_{1c}(t')} dt',$$

Net phase shift for |10⟩:

$$\varphi_{01} = \int_0^{t_{gate}} \frac{g_{2c}^2}{\Delta_{2c}(t')} dt',$$

Net phase shift for |11⟩:

$$\varphi_{11} = \int_0^{t_{gate}} \left( \frac{g_{1c}^2}{\Delta_{1c}(t')} + \frac{g_{2c}^2}{\Delta_{2c}(t')} \right) dt',$$

where the two-qubit gate time is given by:

$$t_{gate} = \varphi \left( \frac{|\Delta_{1c}|}{g_{1c}^2} + \frac{|\Delta_{2c}|}{g_{2c}^2} \right). \quad (3)$$

Equation 3 shows that the quantum logic gate can be made fast by increasing the qubit-coupler couplings ($g_{1c}$, $g_{2c}$) or by decreasing the qubit-coupler detunings ($\Delta_{1c}$, $\Delta_{2c}$). In some cases, the gate time can be optimized using different pulse shapes for the coupler control signal. In some cases, improving the performance of the gate can present a trade-off between the gate time and the fidelity of the gate. For example, to have a faster gate, a step-function (fast changing) pulse shape can be used or the coupler operating frequency can cross the qubit operating frequencies. This may increase the leakage of populations to the state of the coupler device, thus reducing the gate fidelity. In some cases, a high fidelity gate can be achieved by using a slowly-varying pulse, which may require a long gate time. An optimal performance of the gates may, in some cases, combine the optimization of the pulse shape, coupling strength, and the qubit-coupler frequency detunings.

In the example shown in FIG. 3A, the coupler operating frequency approaches the qubit operating frequencies of the qubit devices from different directions, and the phase shifts that the quantum states of the qubit devices acquire have opposite signs, $\varphi_{10}=-\varphi_{01}$ and $\varphi_{11}=\varphi_{10}+\varphi_{01}=0$. For appropriate choice of these phases, a two-qubit gate can be generated. For example, if $\varphi_1=\pi$, $$M = \begin{pmatrix} 1 & 0 & 0 & 0 \\ 0 & -1 & 0 & 0 \\ 0 & 0 & -1 & 0 \\ 0 & 0 & 0 & 1 \end{pmatrix} = \sigma_{1z} \otimes \sigma_{2z}, \quad (4)$$

which is a generator of two-qubit Clifford group and is thus universal.

FIG. 3B is another energy level diagram 350 for the example quantum computing system represented in FIG. 2D. The example energy level diagram 350 shown in FIG. 3B includes six energy levels 352, 354, 356, 358, 360 and 362 for the first and second qubit devices 252A, 252B and the coupler device 254. In FIG. 3B, the quantum state of the coupler device 254 is represented by the third position in each ket, and three energy levels of the qubit devices 252A, 252B are represented.

In FIG. 3B, the first energy level 352 corresponds to the quantum state |000⟩, where the qubit devices 252A, 252B and the coupler device 254 are in their respective ground states. The second energy level 354 corresponds to the quantum state |100⟩, where the first qubit device 252A is in its first excited state and the second qubit device 252B and coupler device 254 are in their respective ground states. The third energy level 356 corresponds to the quantum state |010⟩, where the first qubit device 252A and the coupler device 254 are in their respective ground states and the second qubit device 252B is in its first excited state. The fourth energy level 358 corresponds to the quantum state |200⟩, where the first qubit device 252A is in its second excited state (its two-photon state) and the second qubit device 252B and coupler device 254 are in their respective ground states. The fifth energy level 360 corresponds to the quantum state |020⟩), where the first qubit device 252A and the coupler device 254 are in their respective ground states and the second qubit device 252B is in its second excited state (its two-photon state). The sixth energy level 362 corresponds the quantum state |110⟩, where the qubit devices 252A, 252B are in a joint excited state and the coupler device 254 is in its ground state.

The example energy level diagram 350 also shows the energy level corresponding to the coupler operating frequency 370 of the coupler device 254. The example coupler operating frequency 370 changes over time as shown from left to right in FIG. 3B. In this example, the coupler operating frequency begins at a "park" position, which is a first frequency level 371 above the frequency corresponding to the energy level 362 of the joint excited state of the two qubit devices 252A, 252B. One or more coupler control signals can be communicated to the coupler device 254 to tune the coupler operating frequency 370 and generate one or more interactions that perform a quantum logic gate on both qubit devices 252A, 252B.

In the example shown in FIG. 3B, the coupler operating frequency 370 is lowered toward the frequency of the joint excited state of the two qubit devices 252A, 252B to perform a controlled-phase gate on the first and second qubit devices 252A, 252B. In this example, the coupler operating frequency 370 initially decreases at 372A from the first frequency level 371 toward the joint excited state level 362. After decreasing at 372A, the coupler operating frequency 370 is maintained at a second frequency level 374 near the joint excited state level 362. At the second frequency level 374, interactions between the coupler device 254 and the first and second qubit devices 252A, 252B generate an AC Stark shift which gives rise to a controlled-phase in the quantum state of the first and second qubit devices 252A, 252B. The coupler operating frequency 370 then increases at 372B from the second frequency level 374 and returns to the "park" position, which is the first frequency level 371. In some cases, a DC pulse or another type of coupler control signal received at the coupler device 254 causes the coupler operating frequency 370 to change as shown in FIG. 3B and described above.

In FIG. 3B, an example two-qubit gate is shown in a three-level representation of the quantum computing system shown in FIG. 2D. In particular, the two-qubit controlled-phase gate is performed by controlling the coupler operating frequency of the coupler device 254 such that it approaches the frequency of the |110⟩ state from the above. In this example, tuning the coupler operating frequency in this manner induces, due to an AC Stark shift, a significant phase shift on the |110⟩ state and small phase shifts on |200⟩ and |020⟩ states. The controlled-phase gate can be defined in the computational basis |00⟩, |10⟩, |11⟩, and thus not affected by the phase shifts on other energy levels. The controlled-phase gate can be represented by the following matrix $$U = \begin{pmatrix} 1 & 0 & 0 & 0 \\ 0 & 1 & 0 & 0 \\ 0 & 0 & 1 & 0 \\ 0 & 0 & 0 & e^{i\varphi_{11}} \end{pmatrix}. \quad (5)$$

As an example, when the coupler frequency is tuned close to the frequency of |11⟩ such that $\varphi_{11}=\pi$, the unitary operator in Equation 5 yields the Controlled-Z gate. In some cases, the gate can be performed faster by allowing the frequency of the coupler device 254 to cross the frequency of the |11⟩ state. The technique shown in FIG. 3B may be used to perform other quantum logic gates in some instances.

Figure 4:
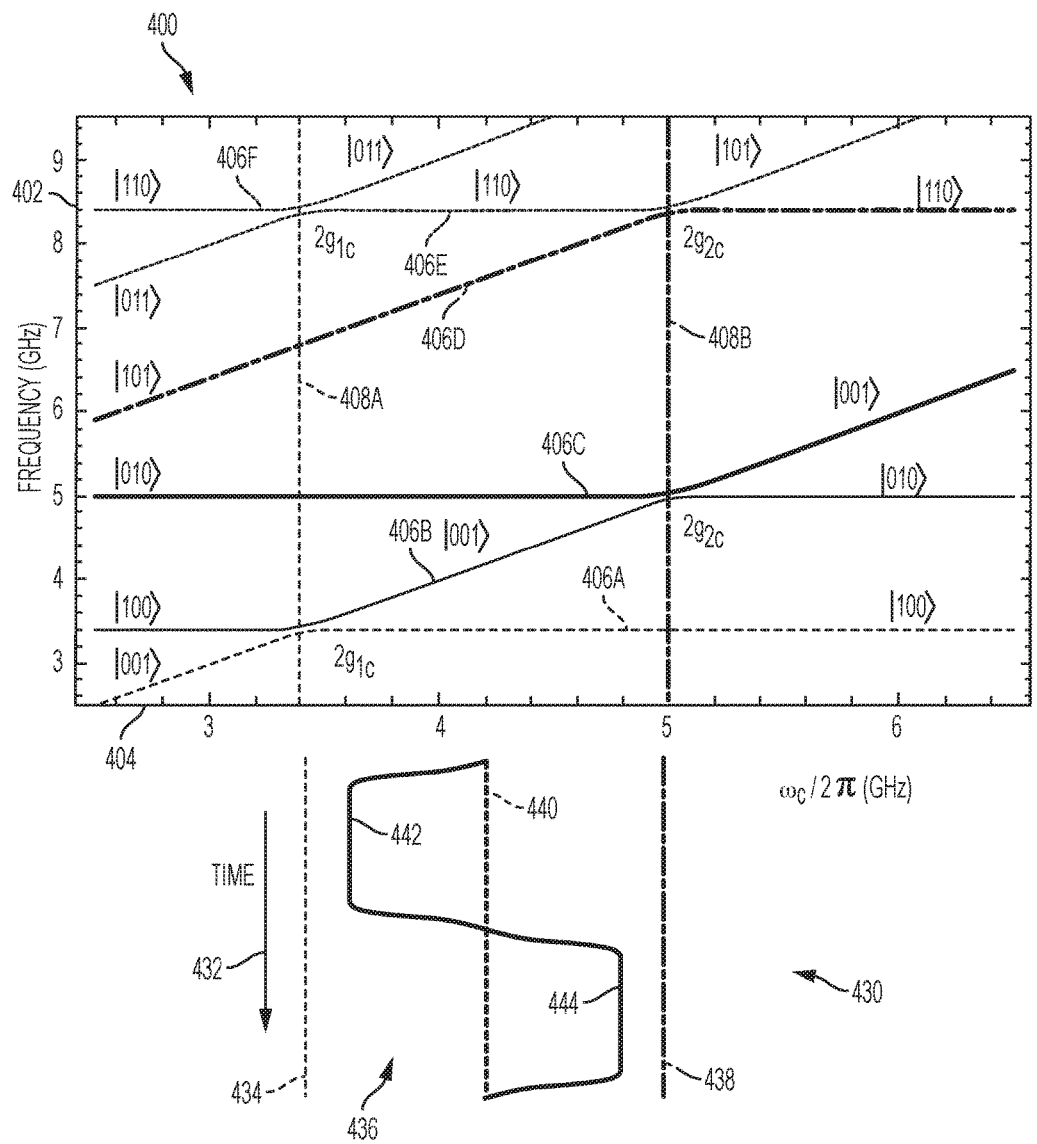
FIG. 4 is a plot of eigenfrequencies for an example quantum computing system.

FIG. 4 is a plot 400 of eigenfrequencies for the example quantum computing system represented in FIG. 2D, based on the parameter values shown in Table I above. In particular, the eigenfrequencies of six eigenstates are plotted over a range of coupler operating frequencies. The plot 400 includes a vertical axis 402 that represents a range of eignfrequencies for the eigenstates plotted (in units of GHz) and a horizontal axis 404 that represents a range of frequencies for the coupler operating frequency $\omega_c$ (in units of GHz). FIG. 4 also includes a time plot 430, which includes a vertical axis 432 representing time in arbitrary units.

In the plot 400 shown in FIG. 4, the first value in each ket represents the first qubit device 252A, the second value in each ket represents the second qubit device 252B, and the third value in each ket represents the coupler device 254. The lowest eigenfrequency in the plot is represented by curve 406A; the second eigenfrequency is represented by curve 406B; the third eigenfrequency is represented by curve 406C; the fourth eigenfrequency is represented by curve 406D; the fifth eigenfrequency is represented by curve 406E; and the highest in the plot eigenfrequency is represented by curve 406F. The qubit operating frequencies of the qubit devices are represented by vertical lines in the plot 400. In particular, the qubit operating frequency ($\omega_1/2\pi$) of the first qubit device 252A is represented by the vertical line 408A, and the qubit operating frequency ($\omega_2/2\pi$) of the second qubit device 252B is represented by the vertical line 408B. The minimum gap distances ($2g_{1c}$, $2g_{2c}$) between each pair of neighboring curves are labeled in the figure.

The time plot 430 shows an example of how the coupler operating frequency 436 can be tuned to perform a two-qubit quantum logic gate. The time plot 430 shows a time sequence for the coupler operating frequency 436 of the coupler device 254. The qubit operating frequency ($\omega_1/2\pi$) of the first qubit device 252A is represented by the vertical line 434, and the qubit operating frequency ($\omega_2/2\pi$) of the second qubit device 252B is represented by the vertical line 438.

In the example time plot 430, the coupler operating frequency 436 is initially set at its "park" frequency, which is the frequency level 440 approximately halfway between the frequencies of the first and second qubit devices (3.4 and 5 GHz, respectively). From the park frequency, the coupler operating frequency 436 is tuned to a second frequency level 442 (at or near 3.4 GHz) and then back to the park frequency; the coupler operating frequency 436 is then tuned to a third frequency level 444 (at or near 5 GHz) and then back to the park frequency. The phase shifts acquired by the two-qubit states (where the coupler is in its ground state) are as follows $$\varphi_{110} = \int_0^{t_{gate}} \left( \frac{g_{1c}^2}{\Delta_{1c}(t')} + \frac{g_{2c}^2}{\Delta_{2c}(t')} \right) dt', \quad (6a)$$

$$\varphi_{100} = \int_0^{t_{gate}} \frac{g_{1c}^2}{\Delta_{1c}(t')} dt', \quad (6b)$$

$$\varphi_{010} = \int_0^{t_{gate}} \frac{g_{2c}^2}{\Delta_{2c}(t')} dt', \quad (6c)$$

for the dispersive approximation where the qubit-coupler detunings are much larger than their mutual couplings.

In this example, the qubit frequency profile can be of the form $$\omega_c(t) = \omega_c^{OFF} + \frac{\omega_c^{ON} - \omega_c^{OFF}}{2} \left[ \text{Erf}\left( \frac{t - t_{ramp}}{\sqrt{2}\,\sigma} \right) - \text{Erf}\left( \frac{t - t_1 + t_{ramp}}{\sqrt{2}\,\sigma} \right) \right],$$

$$0 \le t \le t_1$$

$$\omega_c(t) =$$

$$\omega_c^{OFF} - \frac{\omega_c^{ON} - \omega_c^{OFF}}{2} \left[ \text{Erf}\left( \frac{t - t_1 + t_{ramp}}{\sqrt{2}\,\sigma} \right) - \text{Erf}\left( \frac{t - (t_1 + t_2) + t_{ramp}}{\sqrt{2}\,\sigma} \right) \right],$$

-continued $$t_1 \leq t \leq t_1 + t_2$$

where $t_1$ is the time of interaction of the first qubit with the coupler, while $t_2$ is the interaction time of the second qubit with the coupler; $t_{ramp}$ is the time for the pulse to ramp up or down from/to the ON and the OFF positions, and $\varphi$ is the width (in time) of the front and the rear ramps of the pulse.

Figure 5A:
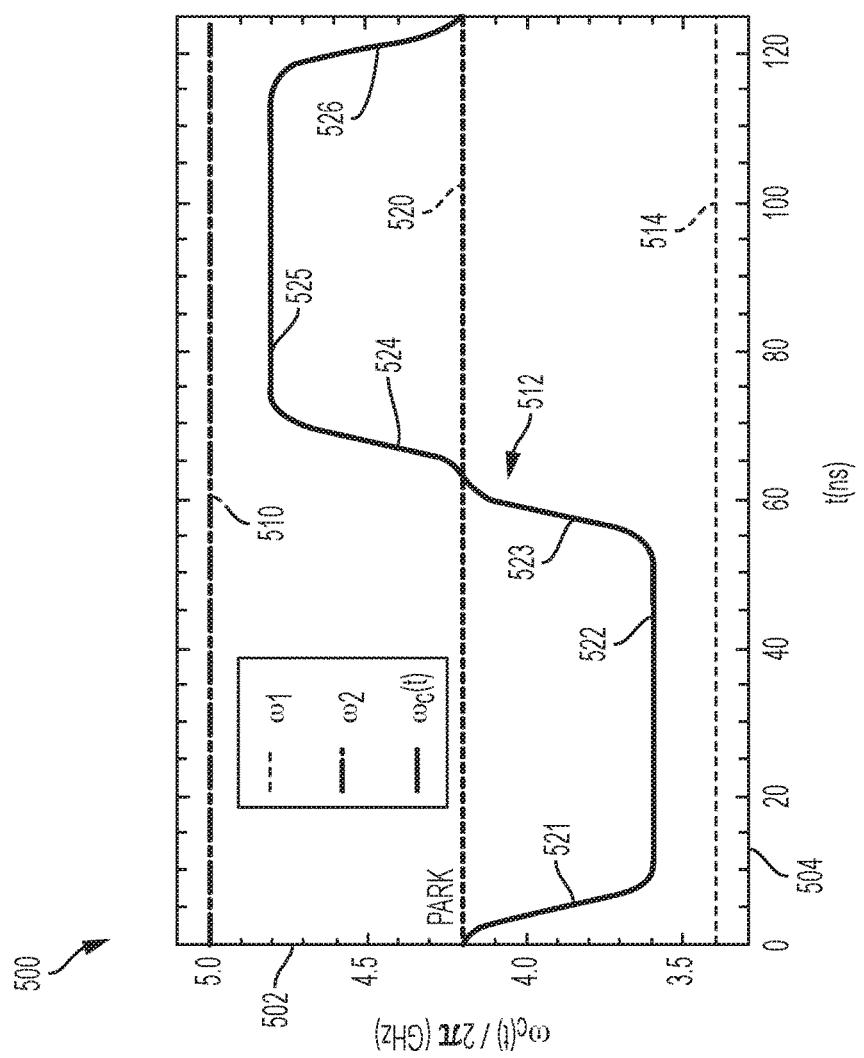
FIG. 5A is a plot of operating frequencies in an example quantum computing system.
Figure 5B:
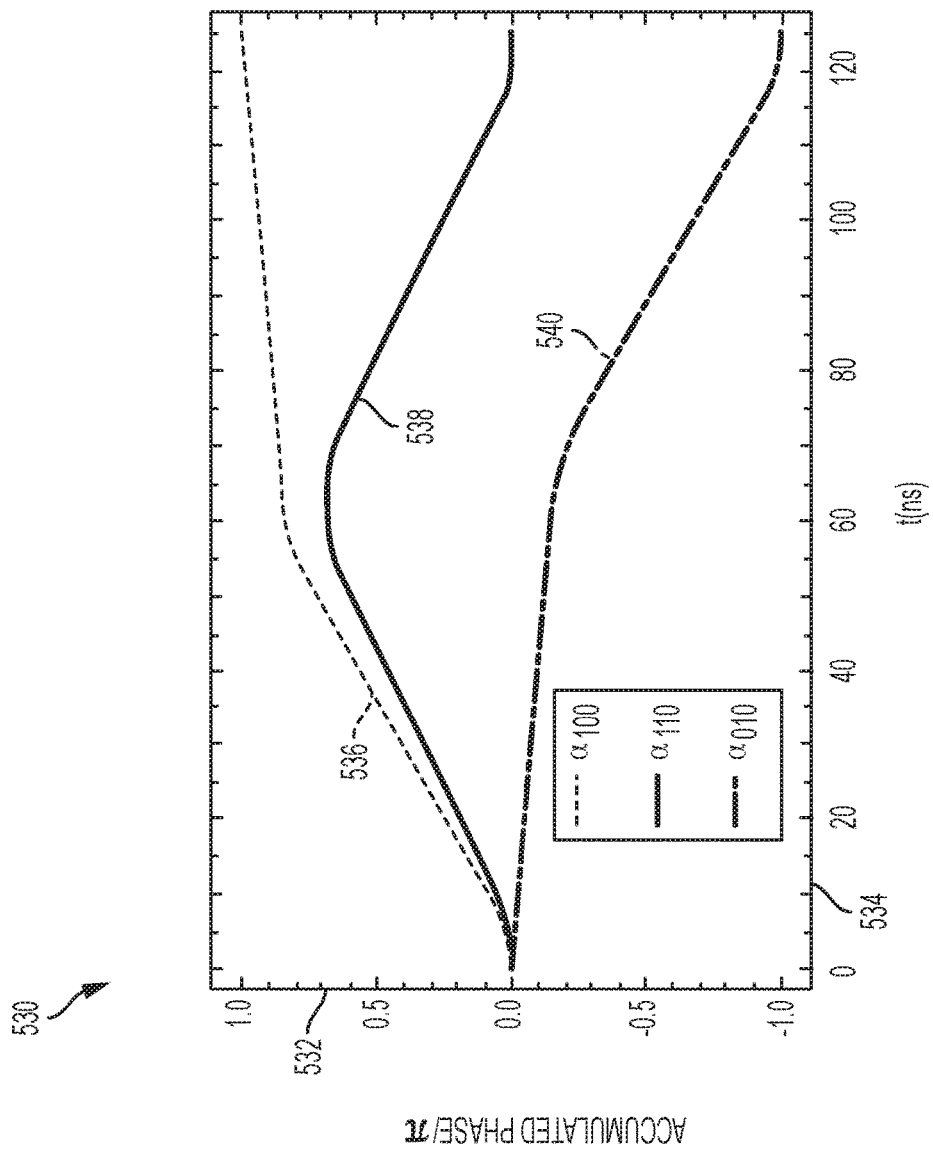
FIG. 5B is a plot of accumulated phases in an example quantum computing system.
Figure 5C:
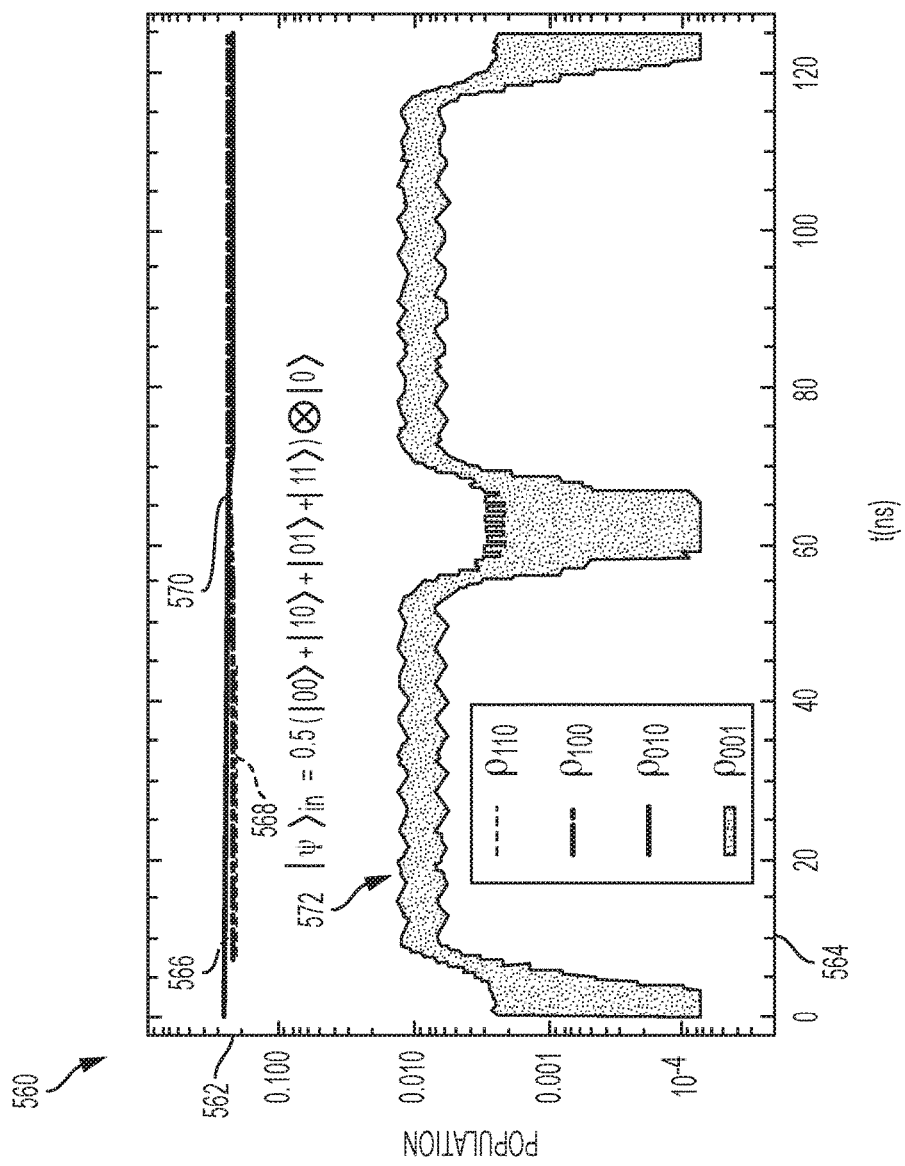
FIG. 5C is a plot of state populations in an example quantum computing system.

FIGS. 5A-5C show properties of an example quantum logic gate using a control sequence based on the coupler operating frequency 436 shown in the time plot 430 of FIG. 4. FIG. 5A is a plot 500 of operating frequencies in the quantum computing system during the quantum logic gate. The plot 500 includes a vertical axis 502 representing a range of frequencies (in units of GHz) and a horizontal axis 504 representing time (in units of ns). The horizontal line 510 represents the qubit operating frequency of the second qubit device 252B, and the horizontal line 514 represents the qubit operating frequency of the first qubit device 252A. The curve 512 between the horizontal lines 510, 514 represents the time-dependent coupler operating frequency of the coupler device 254.

As shown in the plot 500, the coupler operating frequency begins at the intermediate "park" frequency 520, decreases at 521 toward the first qubit operating frequency to a lower operating frequency 522. The coupler operating frequency then increases at 523 back to the intermediate "park" frequency 520. The coupler operating frequency then increases at 524 toward the second qubit operating frequency to an upper operating frequency 525. The coupler operating frequency then decreases at 526 back to the intermediate "park" frequency 520.

FIG. 5B is a plot 530 of accumulated phases in the quantum computing system during the quantum logic gate over the time period shown in FIG. 5A. The plot 530 includes a vertical axis 532 representing a range of accumulated phases (in units of radians/$\pi$) and a horizontal axis 504 representing time (in units of ns). The plot 530 includes a first curve 536 representing the phase accumulated by the $|100\rangle$ state, a second curve 538 representing the phase accumulated by the $|110\rangle$ state, and a third curve 540 representing the phase accumulated by the $|010\rangle$ state. The values in the plot 530 are computed according to Equations 6a, 6b and 6c above. The values in the plot 530 shown in FIG. 5B show that the phases acquired by the middle two diagonal states have equal and opposite signs, while the phase acquired by the $|110\rangle$ state cancels out at the end of the control sequence.

FIG. 5C is a plot 560 of state populations in the quantum computing system during the quantum logic gate over the time period shown in FIG. 5A. The plot 560 includes a vertical axis 532 representing a range of state populations (normalized to a total population of 1) and a horizontal axis 504 representing time (in units of ns). The plot 560 includes a first curve 566 representing the population of the $|110\rangle$ state, a second curve 568 representing the population of the $|100\rangle$ state, a third curve 570 representing the population of the $|010\rangle$ state, and a fourth curve 572 representing the population of the $|001\rangle$ state.

In the example shown in FIG. 5C, the quantum system is initially in a product state:

$$|\psi\rangle_{in} = 0.5(|00\rangle + |10\rangle + |01\rangle + |11\rangle) \otimes |0\rangle.$$

In this example, the performance of the quantum logic gate can be influenced by the amount of population transferred to the state of the coupler device. As shown by the plot 560, the excited state population of the coupler device is less than $3 \times 10^{-3}$, indicating that the fidelity of the two-qubit gate is 99.7%. In some cases, the fidelity of the gate can be optimized or otherwise improved by varying the coupling strength and the detuning between coupler device 254 and the respective qubit devices 252A, 252B.

Figure 6:
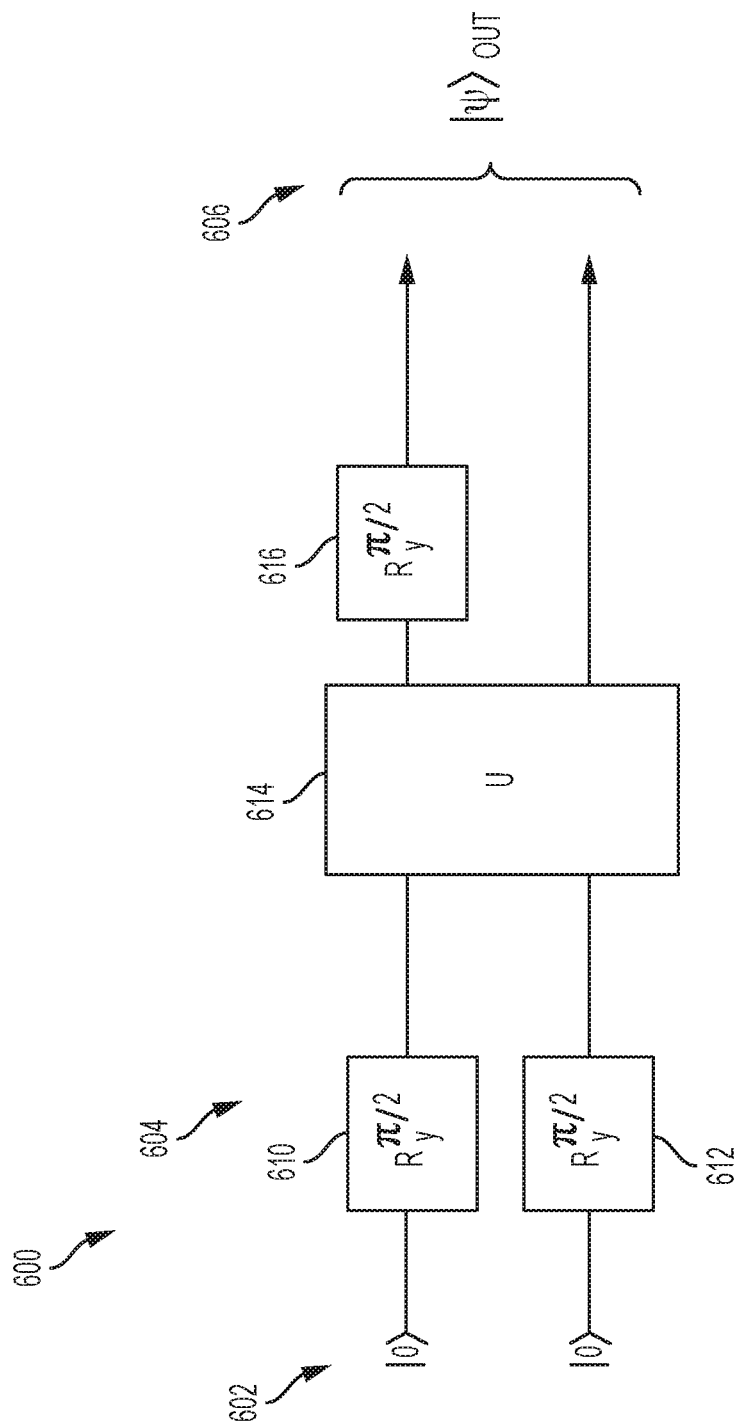
FIG. 6 is a diagram of an example quantum logic circuit.

FIG. 6 is a diagram of an example quantum logic circuit 600. The example quantum logic circuit 600 can represent an entanglement on demand generator. A gate sequence 604, which is a combination of single-qubit gates and two-qubit gates, can be used to generate one of the four Bell states, depending on the initial state and the particular two-qubit gate used. In the example shown, the gate sequence 604 is applied to an initial state of two qubits ($|00\rangle$) to produce an output state $|\psi\rangle_{out}$. The gate sequence 604 includes a single-qubit gate 610 (a $\pi/2$ rotation about the y-axis) applied to the first qubit, a single-qubit gate 612 (a $\pi/2$ rotation about the y-axis) applied to the second qubit, a two-qubit gate 614 (a unitary operation U) applied to the first and second qubits, and a single-qubit gate 616 (a $\pi/2$ rotation about the y-axis) applied to the first qubit.

The example quantum logic circuit 600 in FIG. 6 shows the quantum logic gate can be used in a quantum logic circuit to implement a logical quantum operation. First, the qubits are initialized in their ground state, for example, by waiting for a time longer than their intrinsic relaxation times. Then, a $\pi/2$ rotation about the y-axis is applied to each qubit to prepare them in their superposition states. Then, the two-qubit gate is applied to both qubits, followed by a $\pi/2$ rotation about the y-axis of the first qubit, which projects the quantum state onto one of the four Bell states (depending on the parameters of the two-qubit gate 614). In some cases, the two-qubit gate can be a controlled-phase gate, and the techniques demonstrated in FIGS. 3A, 3B, 4, 5A, 5B, and 5C can be used to perform the two-qubit gate 614.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A quantum information control method for performing a quantum logic gate, the method comprising:
    receiving a coupler control signal at a coupler device in a quantum processor cell; and
    in response to the coupler control signal:
        changing a coupler operating frequency of the coupler device toward a qubit operating frequency of a qubit device in the quantum processor cell;
        producing a phase shift in a quantum state of the qubit device by an interaction between the qubit device and the coupler device; and
        varying the coupler operating frequency over a time period of the interaction,
        wherein the interaction produces a phase shift $$\varphi = \int_0^t \frac{g^2}{\Delta(t')} dt',$$

where t represents the time period, g represents a coupling strength between the coupler device and the qubit device, and Δ(t') represents a difference between the coupler operating frequency and the qubit operating frequency.

2. The quantum information control method of claim 1, comprising maintaining the coupler device in a ground state during the interaction.

3. The quantum information control method of claim 1, comprising, in response to the control signal, maintaining the coupler operating frequency at a constant level during at least a portion of the time period.

4. The quantum information control method of claim 1, wherein the phase shift is controlled, at least in part, by a duration of the coupler control signal and an amplitude of the coupler control signal.

5. The quantum information control method of claim 1, wherein the coupler control signal comprises a bias signal that varies an offset electromagnetic field experienced by the coupler device.

6. The quantum information control method of claim 1, wherein the coupler device comprises a fluxonium qubit device and the qubit device comprises a transmon qubit device.

7. The quantum information control method of claim 1, wherein the interaction induces an energy level repulsion that gives rise to the phase shift.

8. The quantum information control method of claim 1, wherein the control signal comprises a direct current (DC) electrical signal.

9. A quantum computing system comprising:
a coupler device in a quantum processor cell;
a qubit device in the quantum processor cell; and
a control system communicably coupled to the quantum processor cell and operable to:
generate a coupler control signal configured to tune a coupler operating frequency of the coupler device toward a qubit operating frequency of the qubit device; and
communicate the coupler control signal to the coupler device to:
generate, between the qubit device and the coupler device, an interaction that produces a phase shift in a quantum state of the qubit device; and
vary the coupler operating frequency over a time period of the interaction,
wherein the interaction produces a phase shift $$\varphi = \int_0^t \frac{g^2}{\Delta(t')} dt',$$

where t represents the time period, g represents a coupling strength between the coupler device and the qubit device, and Δ(t') represents a difference between the coupler operating frequency and the qubit operating frequency.

10. The quantum computing system of claim 9, wherein the control system is operable to maintain the coupler device in a ground state during the interaction.

11. The quantum computing system of claim 9, wherein the control system is operable to control the phase shift based, at least in part, on controlling a duration of the coupler control signal and an amplitude of the coupler control signal.

12. The quantum computing system of claim 9, wherein the coupler device comprises a fluxonium qubit device and the qubit device comprises a transmon qubit device.

13. The quantum computing system of claim 9, wherein the control signal is configured to produce, between the qubit device and the coupler device, an energy level repulsion that gives rise to the phase shift.

14. The quantum computing system of claim 9, wherein the control signal comprises a direct current (DC) electrical signal.

* * * * *